3,790,556
ORGANIC SOLVENT SOLUBLE DIAZONIUM COMPOUND FORMED FROM ANIONIC SULFATE OR SULFONATE SURFACTANTS
Towers Doggett, Westbrook, Maine, assignor to Scott Paper Company, Delaware County, Pa.
No Drawing. Filed Apr. 28, 1971, Ser. No. 138,336
Int. Cl. C07c *113/00;* G03c *1/56;* G03f *7/02*
U.S. Cl. 260—141                                    10 Claims

ABSTRACT OF THE DISCLOSURE

Light-sensitive, water-insoluble compounds which are formed by reacting an anionic surfactant of the formula

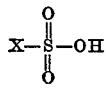

with the formaldehyde condensation product of a diphenylamine-4-diazonium salt and which are soluble in a wide range of organic solvents, and negative working lithographic plates provided with a coating of the light-sensitive compounds.

BACKGROUND OF THE INVENTION

Field of the invention

This invention relates to stable diazonium compounds, more particularly to light-sensitive reaction products of water-soluble, polyfunctional diazonium salts and anionic surfactants, and to the use of these light-sensitive materials as photosensitizers for planographic printing plates.

Description of the prior art

The preparation of polyfunctional diazonium salts by condensing, in the presence of mineral acids, diphenylamine-4-diazonium salts with compounds containing carbonyl groups is known in the art. Condensation is generally effected with formaldehyde in a sulfuric acid condensation medium (U.S. Pat. 2,063,631 granted Dec. 8, 1936 and U.S. Pats. 2,922,715 and 2,946,683). Phosphoric acid (see U.S. Pat. 3,235,384 granted Feb. 15, 1966) and hydrochloric acid (U.S. Pat. 3,277,074 granted Oct. 4, 1966) are also used. The condensation products may be isolated as dry solids in the form of metal halide double salts, primarily zinc chloride double salts. When the condensation is carried out in sulfuric or phosphoric acid the condensation product is a viscous syrup which is used by simple dilution with water to the desired concentration.

Diazonium salts prepared by any of these methods are acceptable photosensitizers and thus find commercial uses in the graphic arts industry in lithographic compositions. As sensitizers for photolithographic plates, however, such diazos suffer from the basic limitation that they are soluble only in water. Printing plates containing such diazos as the photosensitive component are thus subject to rapid loss of sensitivity, or short "shelf life" in high ambient humidity. Further, most photolithographic plates employ aluminum as the substrate, and acid functions attached to many of the prior art aqueous diazos attack the aluminum substrate of the printing plate, causing rapid degeneration of the printing qualities of the plate. In addition, the surface tension of water results in uneven deposition of photosensitive lithographic coatings applied from an aqueous medium. Printing plates with water based coatings will thus be subject to uneven plate image density and irregular densities on the sheets printed from such plates. A diazonium compound which is soluble in most common organic solvents and which has excellent photoresponsive and coating properties is therefore highly desirable in the lithographic art.

It is known in the art to render the above-described condensation products more soluble in organic solvents by reaction with para-toluenesulfonic acid, ammonium fluoroborate or ammonium hexafluorophosphate. See U.S. Pat. 3,544,317, granted Dec. 1, 1970, column 3, lines 24–27. The preparation of a light-sensitive material by reacting a condensation product of the type identified above, namely para-diazodiphenylamine and formaldehyde (hereinafter called the condensation product), and para-toluenesulfonic acid to produce a material which is insoluble in water is disclosed in U.S. Pat. 3,136,637 granted June 9, 1964 in Example II. The para-toluenesulfonate salt of the condensation product is described as oiling out of the aqueous medium in the form of a viscous tar-like resinous material. This reaction product is described as soluble substantially only in methanol.

SUMMARY OF THE INVENTION

Despite the fact that the reaction between para-toluenesulfonic acid and the condensation product is well known, the art has failed to recognize the existence of a broad class of lightsensitive compounds which are formed as precipitates by the reaction of anionic surfactants and the condensation product in an aqueous medium. These compounds are insoluble in water but are soluble in a wide range of organic solvents. The new diazonium compounds are negative-working; that is, the diazo on the photolithographic plate is rendered insoluble by exposure to light which passes through the transparent areas of an original or master transparency. The diazo remains soluble in the unexposed portions of the plate and is removed by application of, for example, a printer's fountain solution, which contains a suitable solvent for the diazo. The printing plate image thus produced is the inverse of that on the original, hence the term "negative-working."

The diazonium compounds of the present invention, while light-sensitive, are moisture and oxidation resistant and accordingly may be stored for long periods of time without decomposition. Lithographic printing plates provided with a light-sensitive coating of the new diazos of the present invention exhibit better aging characteristics under both normal and high humidity conditions than plates prepared with conventional water-soluble polyfunctional diazonium salts. Plates made with diazo compounds of the present invention have several other advantages over such prior art plates. The relatively low surface tension of organic solvents results in much more even deposition of solvent-based coatings than is possible with aqueous coatings, which in turn greatly reduces or eliminates problems of uneven image density associated with aqueous lithographic coatings. When exposed to light the image is more visible, which is an aid to the printer. The image is so ink receptive and so readily developed that the plate may be employed as what the art calls a "water start" plate. Such a plate is simply placed upon a press after imaging, wet with fountain solution, and immediately printed from, without requirement of an additional developing step. The term "water start" is somewhat of a misnomer, for it is the glycerine or alcohol in the fountain solution which dissolves the diazo in the unexposed non-image areas of the plate. In an alternate procedure, the plate may be placed upon the press and swabbed with a starting solution of isopropanol and ammonium sulphite, then immediately used for printing. Finally, the plate has longer run life than prior art plates employing water-soluble diazos in the lithographic topcoating.

These and other advantages and features of the invention will become more readily understood from the following detailed description when read in conjunction with the appended claims.

DETAILED DESCRIPTION

The present inventor has found that water-soluble, light-sensitive polyfunctional diazonium salts can be reacted in an aqueous medium with certain anionic surfactants and that the reaction product thus formed, which is water-insoluble, readily precipitates out of the reaction medium.

Preferred light-sensitive compounds for use in the present invention are the condensation products of para-diazodiphenylamine and formaldehyde (1) formed from a sulfuric acid medium and stabilized with zinc chloride, commercially available from Kalle Aktiengesellschaft of Wiesbaden-Biebrich, West Germany, under the designation Mn 30 and (2) formed from a phosphoric acid medium, sold by Kalle Aktiengesellschaft under the designation Mn 59.

The largest group of anionic surfactants is the group of alkyl sulfates having the general formula $RSO_4H$. The compounds usually commercially available are the "alcohol sulfates," made by sulfating alcohols and neutralizing with caustic or amines. Most are sold as the sodium salt, $RSO_4Na$, formed by neutralization with sodium hydroxide. Applicant has found that satisfactory results have been obtained with the reaction product formed from the following mono-alkyl sulfates: n-butyl, amyl, hexyl, cyclohexyl, octyl, lauryl, oleyl, and stearyl. Many alkyl sulfate surfactants are available commercially. They can be prepared by the following simple laboratory procedure. To the alcohol dissolved in methylene chloride is added an equimolar amount of chloro-sulfonic acid diluted with methylene chloride. After the evolution of hydrogen chloride, the solvent is evaporated, leaving the sulfate as a residue which will vary from an oil in the case of n-butyl, to a waxy solid in the case of stearyl.

In addition to the so-called alcohol sulfates, there exists a variety of sulfates with more complex aliphatic or aromatic components which have been found operable in the present invention. Examples include ammonium lauryl ether sulfate (sold commercially as Sipon EA by Alcolac Chemical Company), an alkylaryl sulfate, para-nonylphenol sulfate, and two aryl-substituted aliphatic sulfates, 2-phenyl ethylsulfate and sodium iso-octyl phenoxy diethoxyethyl sulfate (sold commercially as Triton 770 by Rohm and Haas Chemical Company).

Another group of surfactants is characterized herein as aliphatic sulfonates having the general formula $RSO_3H$ where R is a hydrocarbon, not necessarily a straight-chain hydrocarbon. Examples include sodium dioctyl sulfosuccinate, $C_{20}H_{37}O_4SO_3Na$, and lauryl sulfonates,

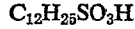

A further type of aliphatic sulfonate as defined in the present specification comprises arylalkyl sulfonates, which may be characterized as $ArRSO_3H$, the sulfonic acid group being directly attached to an aliphatic group. While such surfactants are not commercialy available, they can be prepared by oxidizing in nitric acid a compound of the general formula ArRSH, for example, 3-phenyl-1-propanethiol.

Yet another group of operable surfactants includes alkylaryl sulfonates, which may be characterized as $RArSO_3H$, the sulfonic acid group being directly attached to an aromatic ring. Examples include tertiary butylbenzene sulfonate, para-cyclohexyl benzene sulfonate, dodecyl benzene sulfonate, stearyl benzene sulfonate, and isopropyl naphthalene sulfonate.

The present inventor has found that, in the case of the aliphatic (including arylalkyl) sulfate and sulfonate surfactants, if the total carbon chain has less than four members, only a small amount of reaction product is obtained and it is difficult to recover from the aqueous medium. It appears to the applicant that the reaction product is not truly water insoluble unless this minimum chain length is provided. In the case of the alkylaryl sulfates and sulfonates, where the aryl moiety is phenyl, the carbon chain attached to the phenyl group must have four members in order to provide a compound which may be regarded as an anionic surfactant for the purpose of the present invention. In the case of alkylaryl sulfates and sulfonates where the aryl moiety is naphthyl, an aliphatic chain length of three suffices.

Accordingly, the surfactant for use in the present invention may be defined by the following general expression:

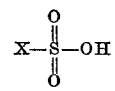

where X is R or RO and R is alkyl of more than three carbon atoms, carbon atoms interrupted by one or more oxyalkylene groups or alkyl or more than three carbon atoms substituted by phenyl, naphthyl, alkylphenyl, alkylnaphthyl, or alkylphenyl or alkylnaphthyl interrupted by one or more oxyalkylene groups or X is RAr or RArO wherein AR is phenyl or naphthyl and when Ar is phenyl R is alkyl or more than three carbon atoms or cycloalkyl and when Ar is naphthyl R is alkyl of more than two carbon atoms or cycloalkyl.

It is largely immaterial whether free acids or salts of any of these surfactants are employed in producing the new diazos.

The following preferred embodiment more fully illustrates the present invention.

EXAMPLE

To an aqueous solution containing 2½% by weight of para-diazodiphenylamine-formaldehyde condensation product formed from a phosphoric acid medium—Kalle's Mn 59—was added an equal volume of an aqueous solution containing 1% by weight of sodium lauryl sulfate (dodecyl sodium sulfate). The precipitate formed as lumps of a yellow crystalline solid which was separated by filtration and washed with water. A two percent solution of the precipitate in a mixed solvent of 60% toluene and 40% isopropanol was prepared.

The surface of a plate base material comprising an aluminum-paper laminate wherein the aluminum is provided with a lithographic top coating was sensitized by coating with the solution of the diazo compound and dried. The sensitized base was then fabricated into plates of a size mountable on a standard lithographic press. A sample was placed in an air-circulating oven at 70° C. for 15 hours. After this accelerated aging, the plate was exposed through a lithographic negative to actinic light, namely a 35 ampere carbon arc lamp at a distance of 25 inches for 15 seconds. The exposed plate was mounted on the press and the press started. The plate was wet with the molleton for several revolutions, and then the inking rollers were brought into contact for several revolutions. When paper was introduced, satisfactory copies were immediately produced. The plate continued to produce twenty thousand clean, clear copies.

The range of solubility of sodium lauryl sulfate and of other compounds representative of the new diazos of the present invention is presented in the following table.

| Reaction product of Mn59 and— | Solubility in— | | | | |
|---|---|---|---|---|---|
| | Toluene/ isopropa- nol, 60/40 | 2-me- thoxy- ethanol | Methyl ethyl ketone | Ethanol | Toluene |
| N-butyl sulfate | PS | S | VSS | PS | NS |
| N-hexyl sulfate | PS | S | VSS | S | NS |
| Monyl phenol sulfate | S | S | S | S | NS |
| Octodecanoyl sulfate | S | S | PS | S | PS |
| Para-toluene solfonate | PS | S | VSS | S | NS |
| Butyl benzene sulfonate | S | S | VSS | S | NS |
| N-octyl sulfate | S | S | PS | S | VSS |
| Dodecyl sulfonate | VSS | S | VSS | PS | NS |
| Sodium lauryl sulfate | S | S | PS | S | PS |

NOTE.—S=Soluble; PS=Partly soluble; VSS=Very slightly soluble; NS=Not soluble.

While the invention has been particularly described with reference to preferred embodiments thereof, it is understood that various other changes and modifications thereof will occur to a person skilled in the art without departing from the spirit and scope of the invention.

What is claimed is:

1. The product formed by reacting in an aqueous medium an anionic surfactant or salt thereof and the condensation product of a diphenylamine-4-diazonium salt with formaldehyde, the surfactant corresponding to the formula

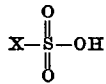

wherein X is R or RO and R is alkyl of more than three carbon atoms, alkyl of more than three carbon atoms interrupted by one or more oxyalkylene groups or alkyl of more than three carbon atoms substituted by phenyl, naphthyl, alkylphenyl, alkylnaphthyl, or alkylphenyl or alkylnaphthyl interrupted by one or more oxyalkylene groups, or X is RAr or RArO wherein Ar is phenyl or naphthyl and when Ar is phenyl R is alkyl of more than three carbon atoms or cycloalkyl and when Ar is naphthyl R is alkyl of more than two carbon atoms or cycloalkyl.

2. The composition according to claim 1 wherein X is RO and R is n-butyl, amyl, hexyl, cyclohexyl, octyl, lauryl, olyeyl or stearyl.

3. The composition according to claim 1 wherein the surfactant is ammonium lauryl ether sulfate 4. The composition according to claim 1 wherein the surfactant is para-nonylphenol sulfate.

5. The composition according to claim 1 wherein the surfactant is 2-phenyl ethylsulfate.

6. The composition according to claim 1 wherein the surfactant is sodium iso-octyl phenoxy diethoxyethyl sulfate.

7. The composition according to claim 1 wherein the surfactant is sodium dioctyl sulfosuccinate.

8. The composition according to claim 1 wherein the surfactant is lauryl sulfonate.

9. The composition according to claim 1 wherein the surfactant is an arylalkyl sulfonate of the formula ArRSO$_3$H.

10. The composition according to claim 1 wherein the surfactant is an alkylaryl sulfonate of the formula RArSO$_3$H.

References Cited
UNITED STATES PATENTS

| | | | |
|---|---|---|---|
| 3,136,637 | 6/1964 | Larson | 96—75 |
| 3,544,317 | 12/1970 | Yonezawa | 96—33 |
| 2,063,631 | 12/1936 | Schmidt et al. | 260—141 |
| 3,050,502 | 8/1962 | Mellan | 260—141 X |
| 3,163,633 | 12/1964 | Steppan et al. | 260—141 |
| 3,277,074 | 10/1966 | Steppan et al. | 260—141 |
| 3,235,382 | 2/1966 | Neugebauer et al. | 260—141 |
| 3,311,605 | 3/1967 | Steppen et al. | 96—33 |
| 3,375,113 | 3/1968 | Doggett | 96—91 |
| 2,612,494 | 9/1952 | Vonglahn et al. | 260—141 |
| 2,612,495 | 9/1952 | Vonglahn et al. | 260—141 |

FLOYD D. HIGEL, Primary Examiner

U.S. Cl. X.R.

96—33, 75; 260—459, 505 R

PO-1050
(5/69)

UNITED STATES PATENT OFFICE
CERTIFICATE OF CORRECTION

Patent No. 3,790,556         Dated    February 5, 1974

Inventor(s)  Towers Doggett

It is certified that error appears in the above-identified patent and that said Letters Patent are hereby corrected as shown below:

Column 4, line 36, "AR" should be --Ar-- line 37, "or" should be --of--, first occurrence.

Column 5, line 46, "olyeyl" should be --oleyl--.

Signed and sealed this 5th day of November 1974.

(SEAL)
Attest:

McCOY M. GIBSON JR.
Attesting Officer

C. MARSHALL DANN
Commissioner of Patents